US012783402B2

(12) United States Patent
Liu et al.

(10) Patent No.: US 12,783,402 B2
(45) Date of Patent: Nov. 3, 2026

(54) MEMORY SPACE EXPANSION METHOD AND APPARATUS, AND ELECTRONIC DEVICE AND COMPUTER-READABLE STORAGE MEDIUM

(71) Applicant: SUZHOU METABRAIN INTELLIGENT TECHNOLOGY CO., LTD., Suzhou (CN)

(72) Inventors: Wei Liu, Suzhou (CN); Dongdong Su, Suzhou (CN); Yanmei Shen, Suzhou (CN); Hongwei Kan, Suzhou (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 244 days.

(21) Appl. No.: 18/565,349

(22) PCT Filed: Jun. 19, 2022

(86) PCT No.: PCT/CN2022/099646

§ 371 (c)(1),
(2) Date: Nov. 29, 2023

(87) PCT Pub. No.: WO2023/098032

PCT Pub. Date: Jun. 8, 2023

(65) Prior Publication Data

US 2025/0284629 A1 Sep. 11, 2025

(30) Foreign Application Priority Data

Nov. 30, 2021 (CN) ........................ 202111438244.4

(51) Int. Cl.
*G06F 12/02* (2006.01)

(52) U.S. Cl.
CPC ........ *G06F 12/023* (2013.01); *G06F 2212/65* (2013.01)

(58) Field of Classification Search
CPC ............... G06F 12/023; G06F 2212/65; G06F 12/1009; G06F 12/109; G06F 12/1072;
(Continued)

(56) References Cited

U.S. PATENT DOCUMENTS

| | | | | |
|---|---|---|---|---|
| 10,503,658 | B2 * | 12/2019 | Basu | G06F 11/3433 |
| 11,163,571 | B1 * | 11/2021 | Barrick | G06F 9/30181 |

(Continued)

FOREIGN PATENT DOCUMENTS

| | | |
|---|---|---|
| CN | 1705269 A | 12/2005 |
| CN | 101419652 A | 4/2009 |

(Continued)

OTHER PUBLICATIONS

Liu Meiyun, et al. "System Architecture Design of Software Radar Information Processing Center" 2017, pp. 441-445 (including English Abstract).

(Continued)

*Primary Examiner* — Michael Krofcheck
(74) *Attorney, Agent, or Firm* — Merchant & Gould P.C.

(57) ABSTRACT

The disclosure discloses a memory space expansion method and apparatus, and an electronic device and a computer-readable storage medium, which are applied to a server. The method includes: receiving an access instruction configured with a virtual address, and querying whether there is a page table entry corresponding to the virtual address in a local page table and a remote page table; in response to the page table entry corresponding to the virtual address being non-existent in the local page table and the remote page table, determining whether there is an unallocated physical address in the server; and in response to the unallocated physical address being non-existent in the server, creating, on the
(Continued)

basis of the physical address in a remote memory array apparatus, a remote memory page table entry corresponding to the virtual address.

18 Claims, 9 Drawing Sheets

(58) Field of Classification Search
CPC ......... G06F 15/17331; G06F 2212/657; G06F 12/0284
See application file for complete search history.

(56) References Cited

U.S. PATENT DOCUMENTS

| | | | | |
|---|---|---|---|---|
| 2009/0113143 | A1* | 4/2009 | Domsch | G06F 12/1009 711/E12.001 |
| 2011/0072234 | A1* | 3/2011 | Chinya | G06F 12/1036 711/E12.001 |
| 2012/0185668 | A1 | 7/2012 | Joo | |
| 2018/0150391 | A1* | 5/2018 | Mitchel | G06F 11/3409 |
| 2019/0220424 | A1* | 7/2019 | Guim Bernat | G06F 12/0831 |
| 2020/0073849 | A1* | 3/2020 | Dormitzer | G06F 13/28 |
| 2020/0233601 | A1* | 7/2020 | Du | G06F 3/0688 |

FOREIGN PATENT DOCUMENTS

| | | | |
|---|---|---|---|
| CN | 103019953 | A | 4/2013 |
| CN | 105335308 | A | 2/2016 |
| CN | 106487896 | A | 3/2017 |
| CN | 107203411 | A | 9/2017 |
| CN | 109684257 | A | 4/2019 |
| CN | 109815170 | A | 5/2019 |
| CN | 112948149 | A | 6/2021 |
| CN | 113868155 | A | 12/2022 |
| WO | 2017181853 | A1 | 10/2017 |

OTHER PUBLICATIONS

Roberto Ammendola, et al. "Virtual-to-Physical Address Translation for an FPGA-based Interconnect with Host and GPU Remote DMA Capabilities", IEEE Xplore,2023, pp. 58-65.
Xun Changqing et al., "Optimized Software-Hardware Comminications for Shared Memory Reconfigurable Computer" Journal of Computer Research and Development, 2013, 59(8):1637-1646 (including English Abstract).

* cited by examiner

MEMORY SPACE EXPANSION METHOD AND APPARATUS, AND ELECTRONIC DEVICE AND COMPUTER-READABLE STORAGE MEDIUM

CROSS-REFERENCE TO RELATED APPLICATION

The present application is a Section 371 National Stage Application of International Application No. PCT/CN2022/099646, filed on Jun. 19, 2022, which claims priority to Chinese patent application No. 202111438244.4, filed on Nov. 30, 2021 in China, and which applications are incorporated by reference in their entireties. To the extent appropriate, a claim of priority is made to each of the above disclosed applications.

TECHNICAL FIELD

The disclosure relates to the technical field of computers, and to a memory space expansion method and apparatus, and an electronic device and a computer-readable storage medium.

BACKGROUND

A virtual memory management technology divides an address space into a virtual address and a physical address. A Memory Management Unit (MMU) is configured to realize the conversion between the virtual address and the physical address.

During the operation of the MMU, maintenance/update of a page table becomes a key section of a system. Each application program (process) has its own page table, which is created by an operating system when the program starts. However, in this case, there is no effective table entry in the page table (when all the table entries are initialized at the establishment of the page table, both time and memory space, which is occupied by the page table itself, are wasted), and only when the application program accesses an address indeed, related table entries are created by a page fault processing program in the operating system.

The inventor realized that, modern Central Processing Unit (CPU) is generally 64-bit, which means that the range of the virtual address is 0-0xFFFFFFFFFFFFFFFF. However, the range of the virtual address is limited by hardware. The physical address of a single server generally ranges from a few tens of GBs to several TBs, which is far less than a virtual address space. That is also to say, the physical address space of the single server cannot meet the requirement of the virtual address space.

Therefore, the way of solving the technical problem that the physical address space of the single server cannot meet the requirement of the virtual address space is a matter of concern for a person skilled in the art.

SUMMARY

The disclosure provides a memory space expansion method, the memory space expansion method is applied to a server. The server includes a first Field Programmable Gate Array (FPGA), and the first FPGA is connected to a second FPGA in a remote memory array apparatus.

The method includes the following operations.

An access instruction configured with a virtual address is received.

In response to a page table entry corresponding to the virtual address being non-existent in a local page table and a remote page table during querying, and an unallocated physical address being non-existent in a server, a remote memory page table entry corresponding to the virtual address is created on the basis of a physical address in the remote memory array apparatus.

In an embodiment, the first FPGA includes a first Remote Direct Memory Access (RDMA) network card module; the second FPGA includes a second RDMA network card module; and the first RDMA network card module is connected to the second RDMA network card module via a network.

In an embodiment, the method further includes the following operation.

In response to a local page table entry or a remote page table entry corresponding to the virtual address existing in the local page table or the remote page table, the virtual address is converted into a physical address on the basis of the local page table entry or the remote page table entry.

In an embodiment, the method further includes the following operation.

In response to the unallocated physical address existing in the server, the local page table entry corresponding to the virtual address is created on the basis of the unallocated physical address in the server.

In an embodiment, after the access instruction configured with the virtual address is received, the method further includes the following operations.

The access instruction is analyzed to determine an instruction type of the access instruction.

Data migration is performed based on a data migration direction in response to instruction type of the access instruction being a data migration type.

Calculation data is calculated based on an instruction code in response to the instruction type of the access instruction being a calculation type and the access instruction includes the calculation data.

In response to the instruction type of the access instruction being the calculation type and the access instruction includes a source virtual address of the calculation data, a source physical address corresponding to the source virtual address is queried from the local page table or the remote page table, the calculation data is read from the source physical address, and the calculation data is calculated based on the instruction code.

In an embodiment, the operation of performing data migration based on the data migration direction includes the following operations.

In response to the data migration direction being from the server to the remote memory array apparatus, and the access instruction includes a first virtual address and a second virtual address, a first physical address corresponding to the first virtual address is queried in the local page table, and a second physical address corresponding to the second virtual address is queried in the remote page table.

First data is read from the first physical address of the server, and the first data is sent to the remote memory array apparatus to be written into the second physical address.

In response to the data migration direction is from the remote memory array apparatus to the server, and the access instruction includes the first virtual address and the second virtual address, the first physical address corresponding to the first virtual address is queried in the local page table, and the second physical address corresponding to the second virtual address is queried in the remote page table.

A memory reading instruction is sent to the remote memory array apparatus, to read second data from the second physical address in the remote memory array apparatus to be written into the first physical address of the server.

In an embodiment, after the calculation data is calculated based on the instruction code, the method further includes the following operation.

In response to a calculation result of the calculation data needing to be saved, and the access instruction includes a target virtual address for saving the calculation result, a target physical address corresponding to the target virtual address is queried from the local page table or the remote page table, and the calculation result is written into the target physical address.

The disclosure provides a memory space expansion apparatus, which is applied to a server. The server includes a first FPGA, and the first FPGA is connected to a second FPGA in a remote memory array apparatus.

The apparatus includes a query module, a determination module, and a first creation module.

The query module is configured to receive an access instruction configured with a virtual address.

The determination module is configured to start an operation process of a first creation module in response to a page table entry corresponding to the virtual address in a local page table and a remote page table during querying, and an unallocated physical address in a server.

The first creation module is configured to create, on the basis of the physical address in a remote memory array apparatus, a remote memory page table entry corresponding to the virtual address.

The disclosure provides an electronic device, which includes a memory, and at least one processor. The memory stores a computer-readable instruction, and when the computer-readable instruction is executed by the at least one processor, the at least one processor is enabled to execute steps of the memory space expansion method described in any one of the above.

The disclosure further provides at least one non-volatile computer-readable storage media, which stores a computer-readable instruction. When the computer-readable instruction is executed by at least one processor, the at least one processor is enabled to execute steps of the memory space expansion method described in any one of the above.

The details of at least one embodiment of the disclosure are set forth in the drawings and the description below. Other features and advantages of the disclosure will be apparent from the drawings and the claims from the specification.

BRIEF DESCRIPTION OF THE DRAWINGS

In order to more clearly illustrate the embodiments of the disclosure or the methods in the prior art, the drawings used in the description of the embodiments or the prior art will be briefly described below. It is apparent that the drawings in the following descriptions are merely some embodiments of the disclosure. Other drawings may also be obtained from those skilled in the art according to these drawings without any creative work. The drawings are configured to provide a further understanding of the present disclosure, and constitute a part of the specification, which are configured to explain the present disclosure with the specific implementations below, and do not constitute a limitation of the present disclosure. In the drawings.

DETAILED DESCRIPTION OF THE EMBODIMENTS

The methods in the embodiments of the disclosure are clearly and completely described below with reference to the drawings in the embodiments of the disclosure. It is apparent that the described embodiments are only part of the embodiments of the disclosure, not all the embodiments. All other embodiments obtained by those of ordinary skill in the art on the basis of the embodiments in the disclosure without creative work all fall within the scope of protection of the disclosure. In addition, in the embodiments of the disclosure, terms "first", "second" and the like are used for distinguishing similar objects rather than describing a specific sequence or a precedence order.

Figure 1:
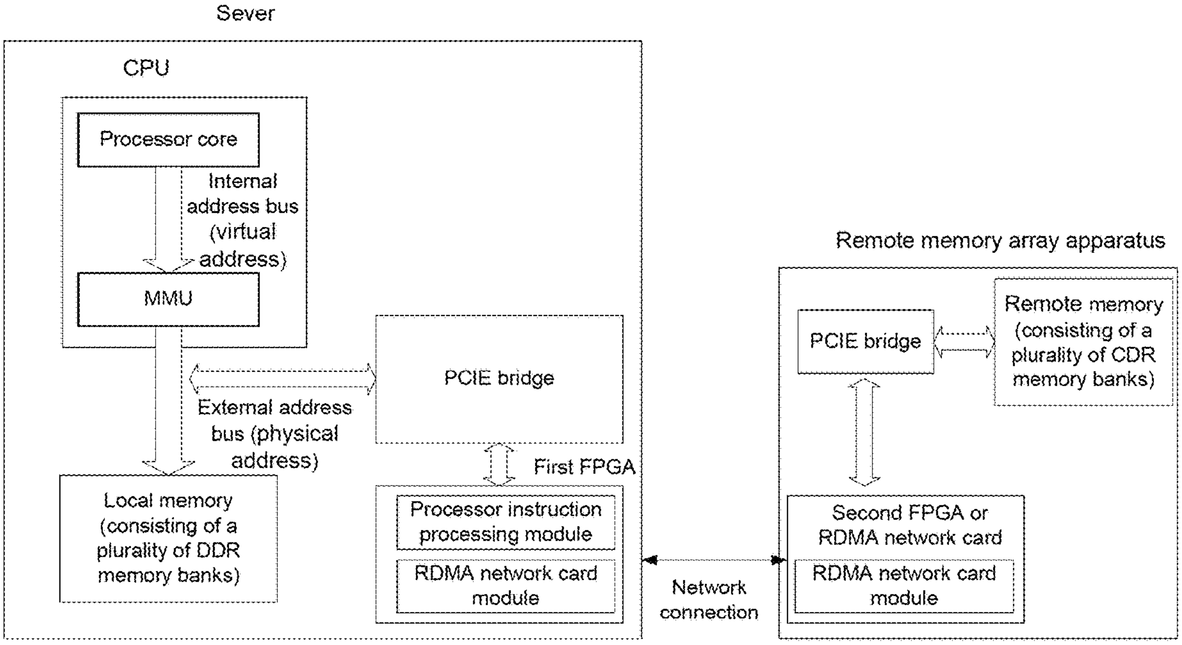
FIG. 1 is an architecture diagram of a memory expansion system according to at least one embodiment of the disclosure.

For ease of understanding of a memory space expansion method provided in the disclosure, a system used by the memory space expansion method is introduced below. FIG. 1 is an architecture diagram of a memory expansion system according to an embodiment of the disclosure. As shown in FIG. 1, the system includes a server and a remote memory array apparatus. The server includes a Central Processing Unit (CPU) chip and a first FPGA; the remote memory array apparatus includes a memory and a second FPGA; and the first FPGA is connected to the second FPGA.

In an embodiment, the first FPGA is inserted into a Peripheral Component Interconnect Express (PCIE) inserting slot of the server, that is the FPGA is connected to an external bus by means of a PCIE bridge. The CPU may access the first FPGA by means of an external address bus-PCIE bridge. The first FPGA may access a local memory by means of a PCIE bridge-external address bus. The local memory includes a plurality of Double Data Rate (DDR) SDRAM memory banks. The memory in the remote memory array apparatus may also be connected to the second FPGA by means of the PCIE.

In an embodiment, the first FPGA includes a processor instruction module and a first RDMA network card module; the second FPGA includes a second RDMA network card module; and the first RDMA network card module is connected to the second RDMA network card module via a network. In an embodiment, a remote memory array is used as a physical carrier for expanding a memory space. The remote memory array is connected to a local server host by means of an RDMA network card. The processor instruction module is configured to access a remote memory on the basis of an access instruction sent by the CPU. A virtual address generated by a processor core is first transmitted to an MMU by means of an internal bus; the MMU converts the virtual address into a physical address; and the memory is accessed via the physical address by using an external bus.

After the CPU issues an instruction related to address access, when the corresponding physical address is in the remote memory array apparatus, a local MMU is bound to have a page fault. A page fault processing program in an operating system checks whether the physical address is local or remote; and when the physical address is remote, a new remote memory page table entry is found or created to obtain the physical address of the remote memory. Then, a instruction code is transferred to a processor instruction processing module in the FPGA. After analyzing a processor instruction and finding the remote memory page table entry, the module accesses the remote memory by means of the RDMA network card module in the FPGA, and may further save, when necessary, an instruction result in a local memory or a processor register.

Currently, the maximum capacity of a single memory is 128 GB, and a CPU may support 8 memory slot positions, which maximally supports 1 TB. A server of a single Non-Uniform Memory Access (NUMA) system may support a plurality of paths of CPUs. When there are two paths, the maximally-supported memory is multiplied by 2; and there are up to 8 paths, the maximally-supported memory is multiplied by 8. That is, a stand-alone server maximally supports a memory of 8 TB.

In the disclosure, a physical memory is expanded to multiple remote memory array apparatus by means of an RDMA network, which may theoretically reach an upper limit of 64-bit addresses. However, the so-called 64 bits may actually and only support a 48-bit virtual address; and herein, even if calculation is performed with 48 bits, an expandable address space may also reach 32 times that of 8 T.

Therefore, in the disclosure, an engineer may run an application program that requires a large physical address space on a single host without changing a program architecture, such that the design complexity of the application program and the cost of development and maintenance are reduced.

An embodiment of the disclosure discloses a memory space expansion method to solve the problem that the physical address space of a single server cannot meet the requirement of the virtual address space.

Figure 2:
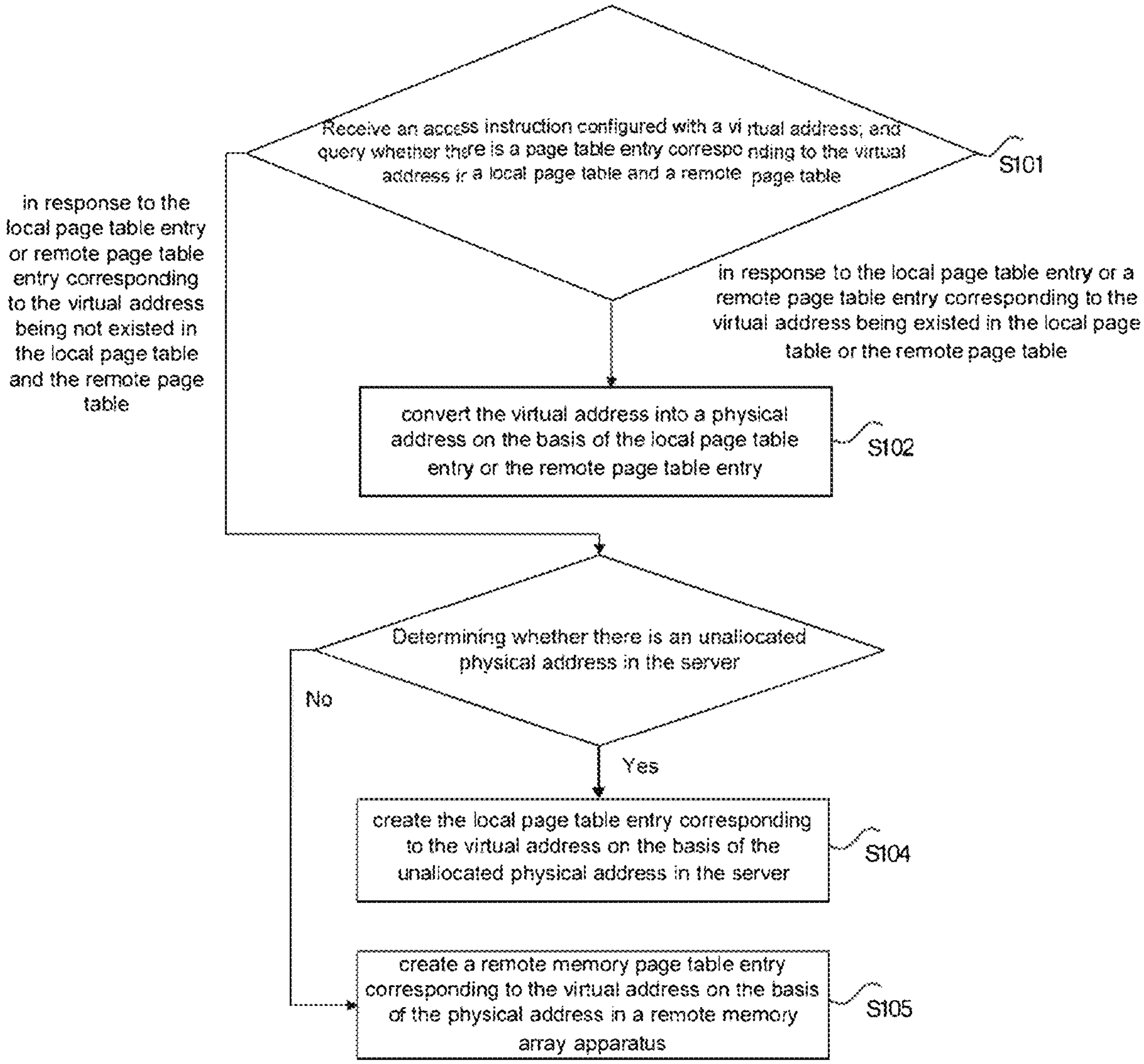
FIG. 2 is a flowchart of a memory space expansion method according to at least one embodiment of the disclosure.

FIG. 2 is a flowchart of a memory space expansion method according to an exemplary embodiment. As shown in FIG. 2, for example, the method is applied to the server in FIG. 1. The method includes the following steps.

At step of S101, an access instruction configured with a virtual address is received; whether there is a page table entry corresponding to the virtual address in a local page table and a remote page table is queried; in response to the local page table entry or a remote page table entry corresponding to the virtual address existing in the local page table or the remote page table, step of S102 is executed; and in response to the local page table entry or remote page table entry corresponding to the virtual address being non-existent in the local page table and the remote page table, step of S103 is executed.

Figure 3:
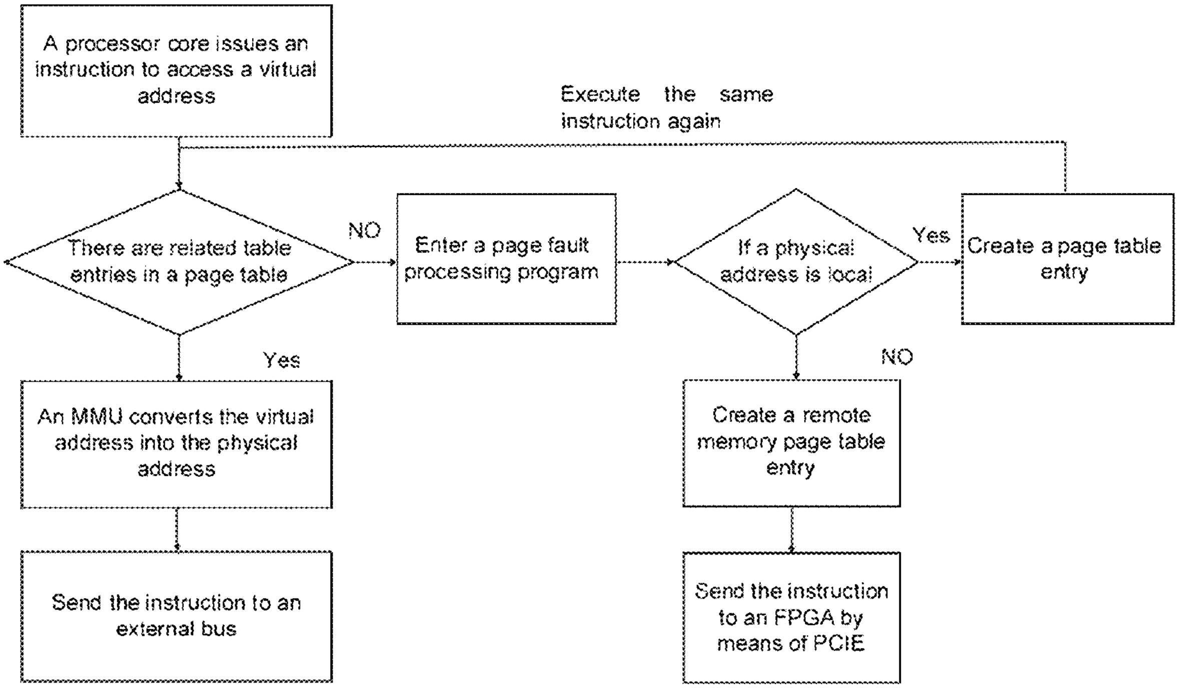
FIG. 3 is a flowchart of another memory space expansion method according to at least one embodiment of the disclosure.

An execution subject of this embodiment is the server introduced in the above embodiments. As shown in FIG. 3, when an MMU receives the access instruction configured with a virtual address and sent by a CPU, whether there is a page table entry corresponding to the virtual address in the local page table and the remote page table is queried; in response to the local page table entry or a remote page table entry corresponding to the virtual address existing in the local page table or the remote page table, the step of S102 is executed; and in response to the local page table entry or remote page table entry corresponding to the virtual address being non-existent in the local page table and the remote page table, the step of S103 is executed. At the step of S102, the virtual address is converted into a physical address on the basis of the local page table entry or the remote page table entry.

In the step of S102, in response to a local page table entry corresponding to the virtual address existing in the local page table, the virtual address is converted into the physical address on the basis of the local page table entry; and in response to a remote page table entry corresponding to the virtual address existing in the remote page table, the virtual address is converted into the physical address on the basis of the remote page table entry, and the access instruction is sent to an external bus.

Figure 4:
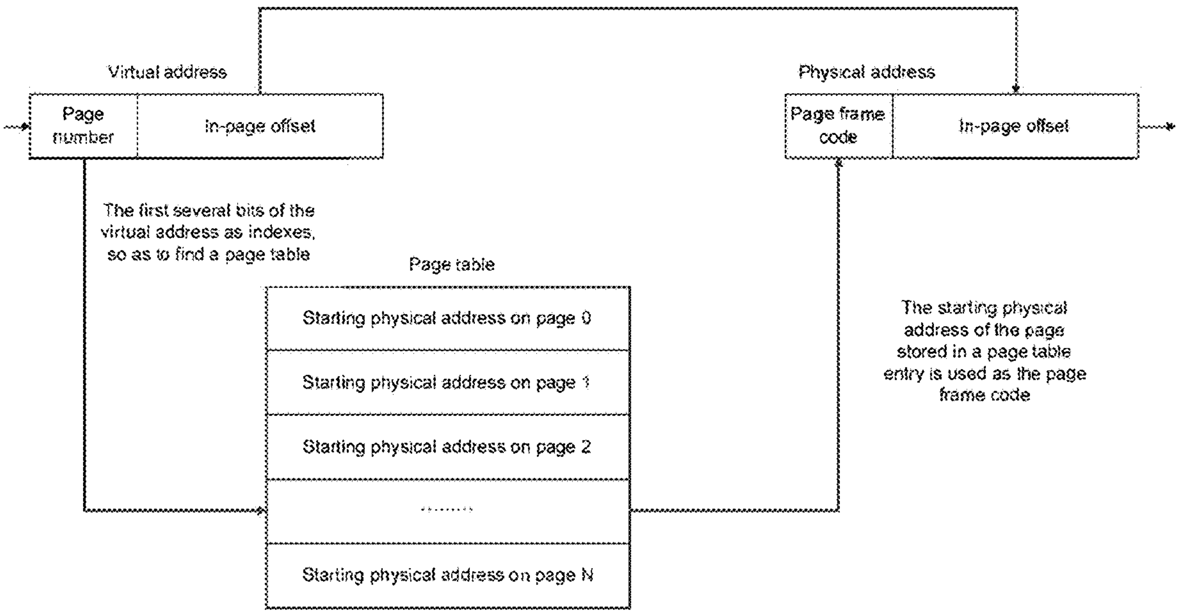
FIG. 4 is a schematic diagram of how an MMU converts a virtual address into a physical address.

As shown in FIG. 4, it is described that the MMU uses a first-level page table to perform conversion between the virtual address and the physical address. The MMU uses the first several bits (the exact number of bits depending on a CPU manufacture or processor implementation standard) of the virtual address sent by a processor core as an index to find a page table; the found page table entry stores a starting address of a corresponding physical address page; and then the starting address is combined as a page frame code with an in-page offset in the virtual address to become the physical address.

At step of S103, whether there is an unallocated physical address in the server is determined; in response to the unallocated physical address being non-existent in the server, step of S104 is executed; and in response to the unallocated physical address existing in the server, step of S105 is executed.

In the step of S103, when there is no local page table entry corresponding to the virtual address in the local page table, and there is no remote page table entry corresponding to the virtual address in the remote page table, a page fault processing program is entered. In this embodiment, the page fault processing program in an operating system in the prior art is modified; before the local page table entry is created, whether there is an unallocated physical address in the server is determined, that is, whether the physical address corresponding to the access instruction is in a memory of the server is determined; if the physical address corresponding to the access instruction is in a memory of the server is determined, the step of S104 is executed; and if the physical address corresponding to the access instruction is not in a memory of the server is determined, the step of S105 is executed.

At step of S104, the local page table entry corresponding to the virtual address is created on the basis of the unallocated physical address in the server.

At step of S105, a remote memory page table entry corresponding to the virtual address is created on the basis of the physical address in a remote memory array apparatus.

The server receives the access instruction configured with the virtual address; whether there is a page table entry corresponding to the virtual address in the local page table and the remote page table is queried; in response to the page table entry corresponding to the virtual address being non-existent in both the local page table and the remote page table during query, whether there is an unallocated physical address in the server is determined; it is determined that there is no unallocated physical address in the server; and the step of creating, on the basis of the physical address in the remote memory array apparatus, the remote memory page table entry corresponding to the virtual address is executed on the basis of a determination result.

In an embodiment, when there is an unallocated physical address in the server, the local page table entry corresponding to the virtual address is created on the basis of the unallocated physical address in the server, that is, a correspondence relationship between the virtual address and the physical address in the server is established. When there is no unallocated physical address in the server, the remote memory page table entry corresponding to the virtual address is created on the basis of the unallocated physical address in the remote memory array apparatus, that is, a correspondence relationship between the virtual address and the physical address in the remote memory array apparatus is established. Then the access instruction is sent to the first FPGA by means of a PCIE channel, and is received by a processor instruction processing module.

The method for creating and finding the remote memory page table entry is similar to that of the local page table entry. It is to be noted that, if the server uses a plurality of remote memory array apparatus, in addition to a value including the physical address, the remote memory page table entry also needs to perform differentiation by adding ID numbers of the remote memory array apparatus.

In an embodiment of the disclosure, the server includes the first FPGA; the remote memory array apparatus include the second FPGAs; and the first FPGA is connected to the second FPGAs to allow the server to access the remote memory array apparatus. When there is no unallocated physical address locally, the physical addresses of the remote memory array apparatus may be allocated. Therefore, in this embodiment of the disclosure, a physical address space of a single server is expanded to solve the technical problem that the physical address space of the single server cannot meet the requirement of a virtual address space.

An embodiment of the disclosure discloses a memory space expansion method. Compared to the previous embodiment, the method is further described and optimized in this embodiment.

Figure 5:
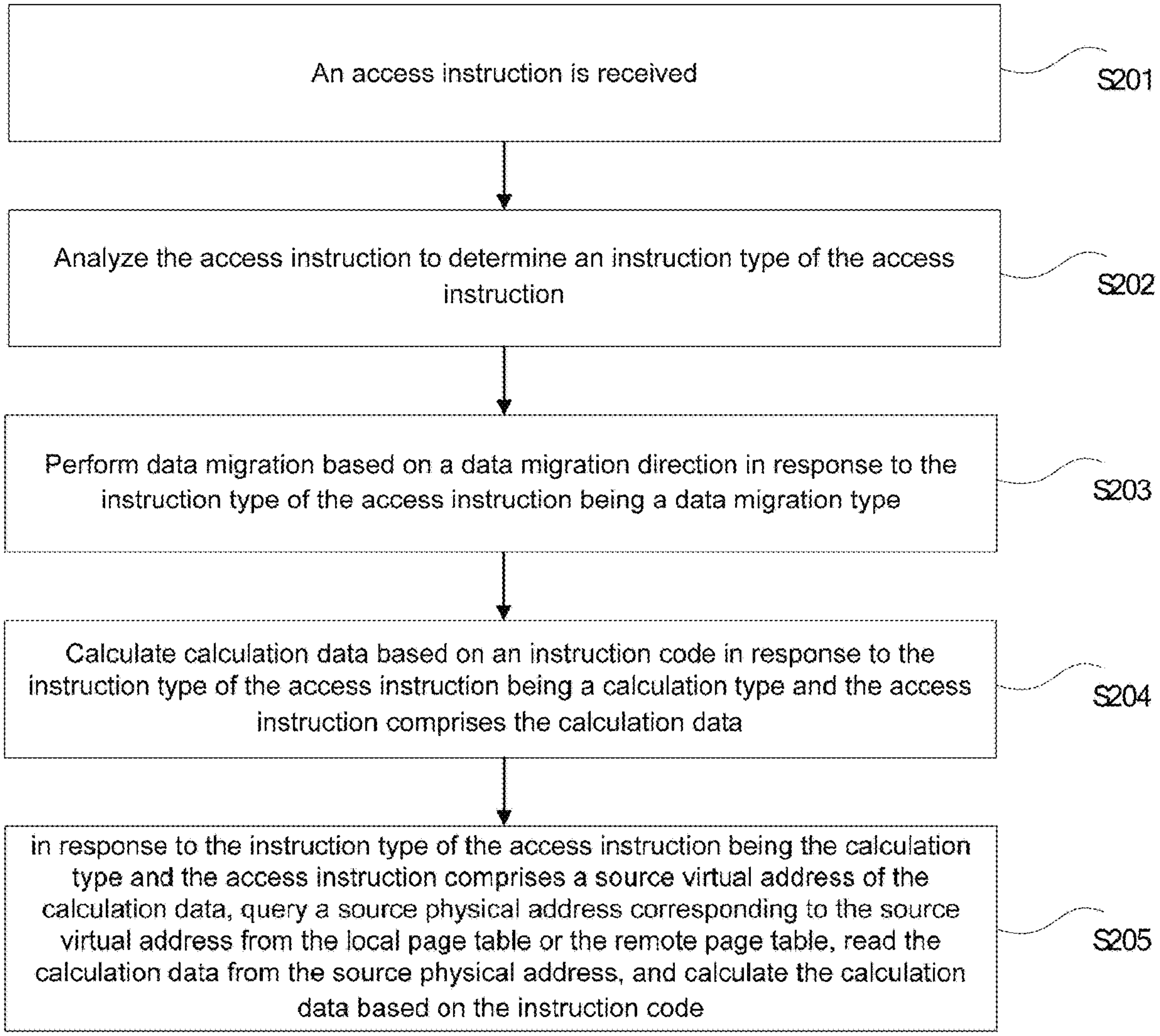
FIG. 5 is a flowchart of still another memory space expansion method according to at least one embodiment of the disclosure.

In an embodiment, FIG. 5 is a flowchart of still another memory space expansion method according to an exemplary embodiment. As shown in FIG. 5, the method includes the following steps.

At step of S201, an access instruction is received.

At step of S202, the access instruction is analyzed to determine an instruction type of the access instruction.

In this embodiment, after the access instruction sent by a processor core is received, a processor instruction processing module in a first FPGA needs to analyze the access instruction to determine the instruction type, and further processing is then performed. The instruction type in this embodiment may include data migration and calculation.

At step of S203, data migration is performed based on a data migration direction in response to the instruction type of the access instruction being a data migration type.

Figure 6:
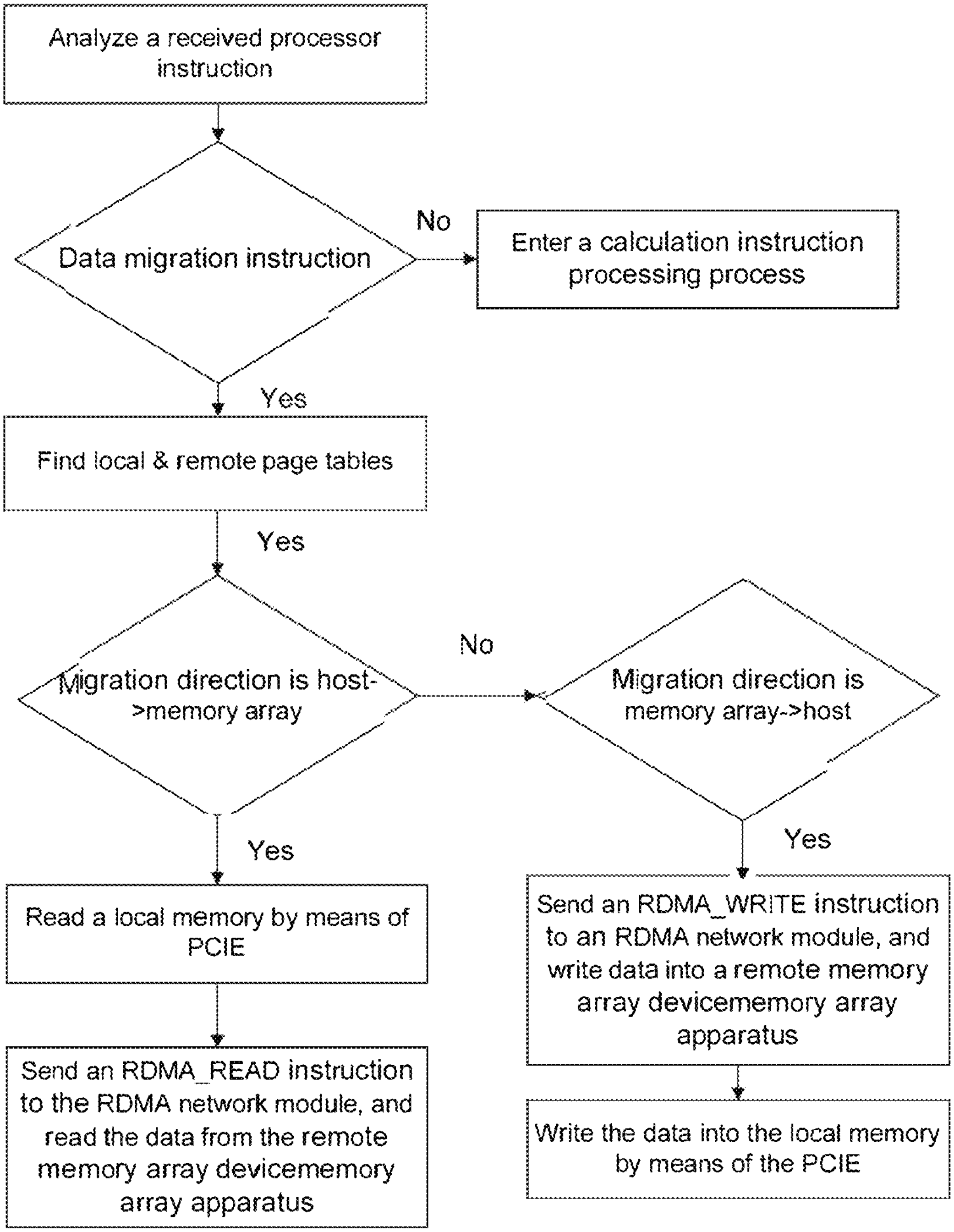
FIG. 6 is a processing flowchart of a data migration instruction according to at least one embodiment of the disclosure.

In an embodiment, as shown in FIG. 6, when the data migration direction is from the server to the remote memory array apparatus, the access instruction includes a source virtual address, which is a first virtual address, in the server, and a target virtual address, which is a second virtual address, in the remote memory array apparatus; a first physical address corresponding to the first virtual address is queried in the local page table, and a second physical address corresponding to the second virtual address is queried in the remote page table; and first data is read from the first physical address of the server, and the first data is sent to the remote memory array apparatus, so as to be written into the second physical address. When the data migration direction is from the remote memory array apparatus to the server, the access instruction includes the target virtual address, which is the first virtual address, in the server, and the source virtual address, which is the second virtual address, in the remote memory array apparatus; the first physical address corresponding to the first virtual address is queried in the local page table, and the second physical address corresponding to the second virtual address is queried in the remote page table; and a memory reading instruction is sent to the remote memory array apparatus, to read second data from the second physical address in the remote memory array apparatus to be written into the first physical address of the server.

At step of S204, calculation data is calculated based on an instruction code in response to the instruction type of the access instruction being a calculation type and the access instruction includes the calculation data.

At step of S205, when the instruction type of the access instruction is the calculation type and the access instruction includes a source virtual address of the calculation data, a source physical address corresponding to the source virtual address is queried from the local page table or the remote page table, the calculation data is read from the source physical address, and then the calculation data is calculated based on the instruction code.

Figure 7:
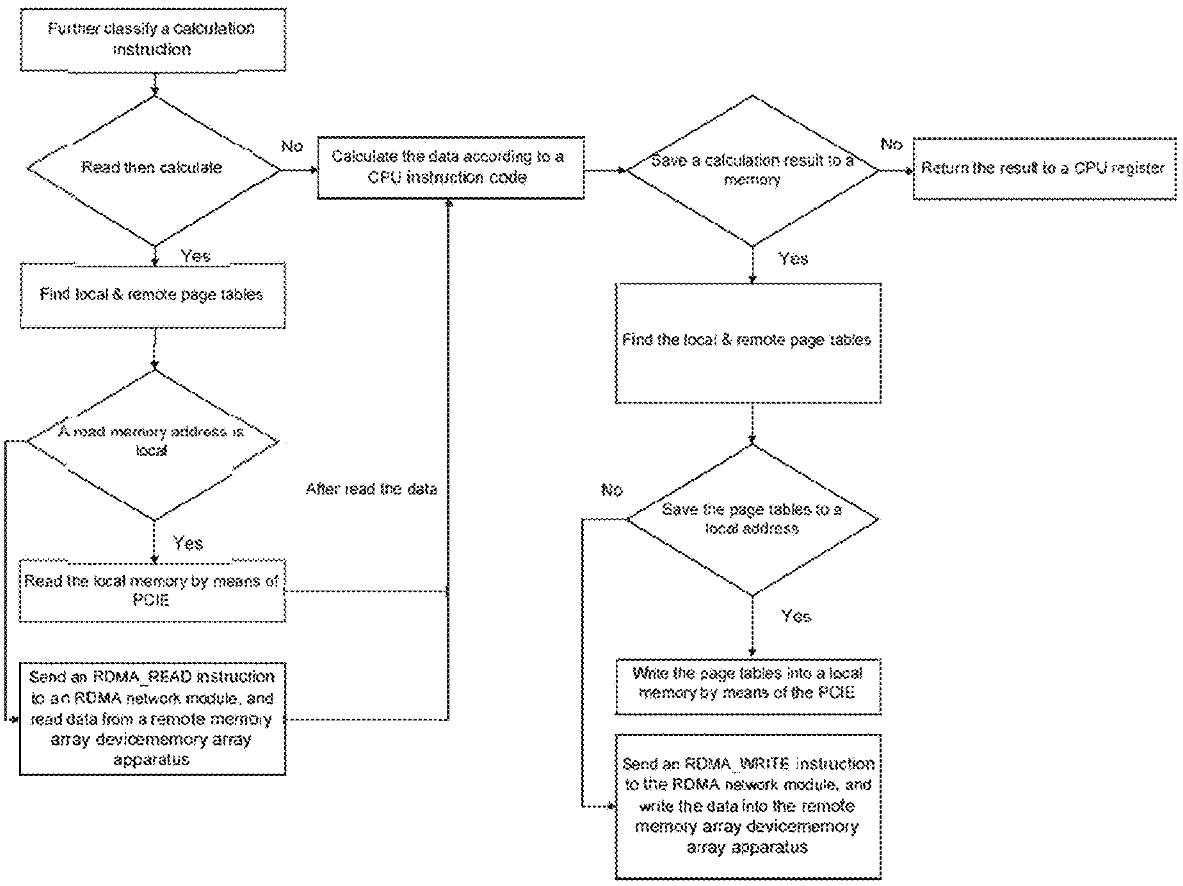
FIG. 7 is a processing flowchart of a calculation instruction according to at least one embodiment of the disclosure.

In an embodiment, when the instruction type of the access instruction is the calculation type, as shown in FIG. 7, the calculation instruction needs to be further classified; and when the instruction type of the access instruction is to read first and then calculate, that is, the access instruction includes the source virtual address including the calculation data, the local page table or the remote page table is queried. When the source physical address corresponding to the source virtual address is in the server, the calculation data is read from the local memory by means of the PCIE; when the source physical address corresponding to the source virtual address is in the remote memory array apparatus, an RDMA_READ instruction is sent to a second RDMA module by means of a first RDMA module; and the calculation data is read from the remote memory array apparatus. After the calculation data is read, the calculation data is calculated according to a CPU instruction code. When the instruction type of the access instruction is to directly calculate, that is, the access instruction includes the calculation data, the calculation data is directly calculated according to the CPU instruction code.

In an embodiment, after the calculation data is calculated based on the instruction code, the method further includes: when a calculation result of the calculation data needing to be saved, and the access instruction includes a target virtual address for saving the calculation result, querying a target physical address corresponding to the target virtual address from the local page table or the remote page table, and writing the calculation result into the target physical address.

In an embodiment, when the calculation result needs to be saved, the access instruction includes the target virtual address saving the calculation result, the local page table or the remote page table is queried. When the target physical address corresponding to the target virtual address is in the server, the calculation result is written into the local memory by means of the PCIE; when the target physical address corresponding to the target virtual address is in the remote memory array apparatus, an RDMA_WRITE instruction is sent to the second RDMA module by means of the first RDMA module; and the calculation result is written into the remote memory array apparatus.

For example, a data migration operation is used as an example below. A memcpy function is directly called for an application program part. Transparently to an application program, when this function is actually executed at a processor level, a data migration instruction is executed, such as a “mov instruction”.

With regard to a page fault part of the operating system, when it is found that a source address or a target address is not in the local memory, a processor instruction code is written into an execution receiving register of the first FPGA, and is received by the processor instruction processing module of the first FPGA.

After the processor instruction processing module finds a page table, when it is found that the target address in the processor instruction is in a remote memory array and the source address is in the local memory, the following operations are performed.

1. The RDMA_WRITE instruction is sent to the RDMA network card module in the FPGA.

2. RDMA network card processing is waited for completion.

A memory space expansion apparatus provided in this embodiment of the disclosure is introduced below. The memory space expansion apparatus described below and the memory space expansion method described above may be used as cross references for each other.

Figure 8:
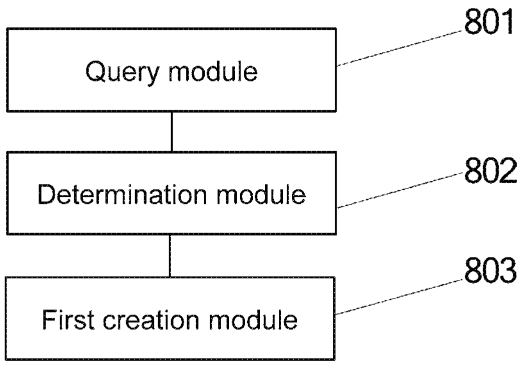
FIG. 8 is a structural diagram of a memory space expansion apparatus according to at least one embodiment of the disclosure.

FIG. 8 is a structural diagram of a memory space expansion apparatus according to an exemplary embodiment. As shown in FIG. 8, the apparatus includes a query module, a determination module, and a first creation module.

The query module 801 is configured to receive an access instruction configured with a virtual address; query whether there is a page table entry corresponding to the virtual address in a local page table and a remote page table; and in response to a page table entry corresponding to the virtual address being non-existent in a local page table and a remote page table, start an operation process of the determination module 802.

The determination module 802 is configured to determine whether there is an unallocated physical address in a server; and in response to an unallocated physical address being non-existent in the server, start an operation process of the first creation module 803.

The first creation module 803 is configured to create, on the basis of the physical address in a remote memory array apparatus, a remote memory page table entry corresponding to the virtual address.

In an embodiment of the disclosure, the server includes the first FPGA; the remote memory array apparatus include the second FPGAs; and the first FPGA is connected to the second FPGAs to allow the server to access the remote memory array apparatus. When there is no unallocated physical address locally, the physical addresses of the remote memory array apparatus may be allocated. Therefore, in this embodiment of the disclosure, a physical address space of a single server is expanded to solve the technical problem that the physical address space of the single server cannot meet the requirement of a virtual address space.

On the basis of the above embodiments, in an embodiment, the first FPGA includes a first RDMA network card module; the second FPGA includes a second RDMA network card module; and the first RDMA network card module is connected to the second RDMA network card module via a network.

On the basis of the above embodiments, in an embodiment, the apparatus further includes a conversion module.

The conversion module is configured to convert the virtual address into the physical address on the basis of the local page table entry or the remote page table entry, when there is a local page table entry or a remote page table entry corresponding to the virtual address in the local page table or the remote page table.

On the basis of the above embodiments, in an embodiment, the apparatus further includes a second creation module.

The second creation module is configured to create a local page table entry corresponding to the virtual address on the basis of the unallocated physical address in the server, if there is an unallocated physical address in the server.

On the basis of the above embodiments, in an embodiment, the apparatus further includes an analysis module, a data migration module, a first calculation module, and a second calculation module.

The analysis module is configured to analyze the access instruction to determine an instruction type of the access instruction.

The data migration module is configured to perform data migration based on a data migration direction when the instruction type of the access instruction is a data migration type.

The first calculation module is configured to calculate calculation data based on an instruction code when the instruction type of the access instruction is a calculation type and the access instruction includes the calculation data.

The second calculation module is configured to, when the instruction type of the access instruction is the calculation type and the access instruction includes a source virtual address of the calculation data, query, from the local page table or the remote page table, a source physical address corresponding to the source virtual address, read the calculation data from the source physical address, and then calculate the calculation data based on the instruction code.

On the basis of the above embodiments, in an embodiment, the data migration module includes a first query unit, a sending unit, a second query unit, and a reading unit.

The first query unit is configured to, if the data migration direction is from the server to the remote memory array apparatus, and the access instruction includes a first virtual address and a second virtual address, query, in the local page table, a first physical address corresponding to the first virtual address, and query, in the remote page table, a second physical address corresponding to the second virtual address.

The sending unit is configured to read first data from the first physical address of the server, and send the first data to the remote memory array apparatus to be written into the second physical address.

The second query unit is configured to, if the data migration direction is from the server to the remote memory array apparatus, and the access instruction includes the first virtual address and the second virtual address, query, in the local page table, the first physical address corresponding to the first virtual address, and query, in the remote page table, the second physical address corresponding to the second virtual address.

The reading unit is configured to send a memory reading instruction to the remote memory array apparatus, to read second data from the second physical address in the remote memory array apparatus to be written into the first physical address of the server.

On the basis of the above embodiments, in an embodiment, the apparatus further includes a saving module.

The saving module is configured to, when a calculation result of the calculation data needing to be saved, and the access instruction includes a target virtual address for saving the calculation result, query, from the local page table or the remote page table, a target physical address corresponding to the target virtual address, and write the calculation result into the target physical address.

For the apparatus in the above embodiments, the manner in which each module performs operations has been described in detail in the embodiments of the method, and details are not described herein again.

Figure 9:
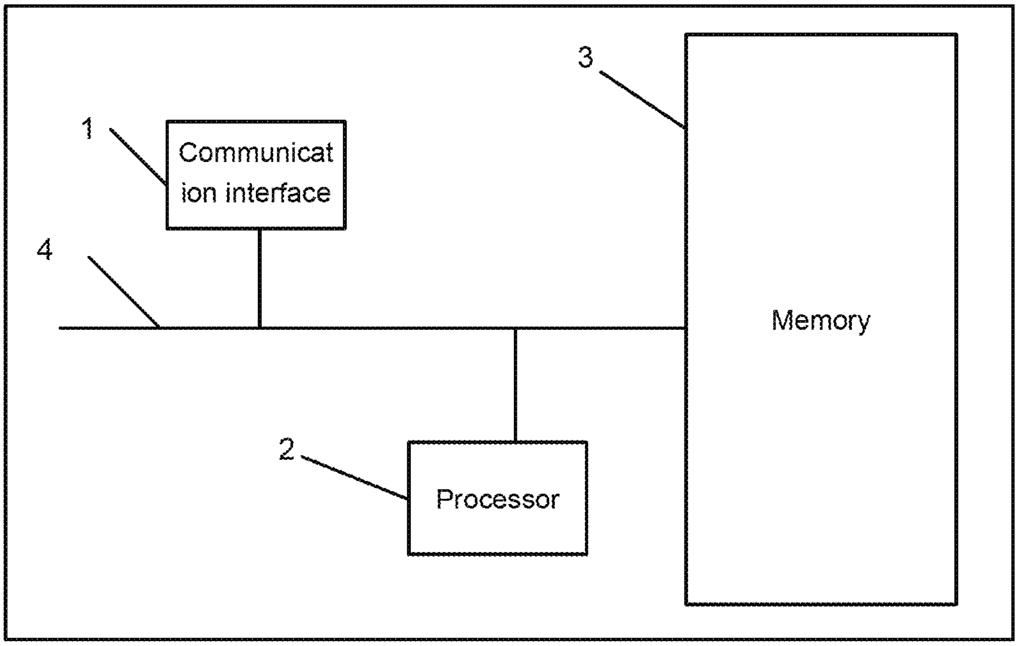
FIG. 9 is a structural diagram of an electronic device according to at least one embodiment of the disclosure.

On the basis of hardware implementation of the above program modules, and in order to implement the method in the embodiments of the disclosure, an embodiment of the disclosure further provides an electronic device. FIG. 9 is a structural diagram of an electronic device according to an exemplary embodiment. As shown in FIG. 9, the electronic device includes a communication interface and a processor.

The communication interface 1 can communicate with other devices, such as a network device.

The processor 2 is connected to the communication interface 1 to achieve information interaction with other devices, and is configured to execute, when running a computer-readable instruction, the memory space expansion method provided in the at least one method. The computer-readable instruction is stored on a memory 3.

Definitely, during a practical application, each assembly in the electronic device is coupled together by means of a bus system 4. It is understandable that, the bus system 4 is configured to achieve connection communication between these assemblies. In addition to including a data bus, the bus system 4 further includes a power bus, a control bus and a state signal bus. However, for the sake of clarity, the various buses are labeled as the bus system 4 in FIG. 9.

The memory 3 in this embodiment of the disclosure is configured to store various types of data to support the operation of the electronic device. Examples of these data include any computer-readable instruction that is operated on the electronic device.

It is understandable that, the memory 3 may be a volatile memory or a non-volatile memory, or may include both the volatile and non-volatile memories. The non-volatile memory may be a Read Only Memory (ROM), a Programmable Read-Only Memory (PROM), an Erasable Programmable Read-Only Memory (EPROM), an Electrically Erasable Programmable Read-Only Memory (EEPROM), a Ferromagnetic Random Access Memory (FRAM), a flash memory, a magnetic surface memory, an optical disk, or a Compact Disc Read-Only Memory (CD-ROM); and the magnetic surface memory may be a magnetic disk memory or a magnetic tape memory. The volatile memory may be a Random Access Memory (RAM), and is used as an external high-speed cache. It is exemplarily but unlimitedly described that, RAMs in various forms may be used, such as a Static RAM (SRAM), a Synchronous Static RAM (SSRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). The memory 3 in the embodiments of the disclosure is intended to include, but not limited to, memories of these and any other proper types.

The method disclosed in the embodiments of the disclosure can be applied to the processor 2, or implemented by the processor 2. The processor2 can be an integrated circuit chip and has a signal processing capacity. During implementation, each step of the method can be completed by an integrated logical circuit of hardware in the processor 2 or an instruction in a software form. The above processor 2 can be a general processor, or can be a DSP, or other programmable logic devices, discrete gate or transistor logic devices, and discrete hardware components. The processor 2 can implement or execute each method, step and logical block diagram disclosed in the embodiments of the disclosure. The general processor can be a microprocessor or any conventional processor. In combination with the method disclosed in the embodiments of the disclosure, the steps can be directly implemented by a hardware processor, or can be performed by a combination of hardware and software modules in the decoding processor. The software modules may be located in a storage medium. The storage medium is located in the memory 3, and the processor 2 reads programs in the memory 3, and completes the steps of the method in combination with hardware.

The processor 2 implements corresponding processes in the methods of the embodiments of the disclosure when executing the computer-readable instruction. For simplicity, elaborations are omitted herein.

In an exemplary embodiment, an embodiment of the disclosure further provides a non-volatile computer-readable storage medium. The non-volatile computer-readable storage medium stores a computer-readable instruction, and when the computer-readable instruction is executed by at least one processor, steps of the memory space expansion method described in any one of the above embodiments may be implemented. Those of ordinary skill in the art may appreciate that implementing all or part of the processes in the methods described above may be accomplished by instructing associated hardware by a computer-readable instruction, which may be stored in a non-volatile computer-readable storage medium, which, when executed, may include processes as embodiments of the methods described above. Any reference to a memory, storage, a database, or other media used in the embodiments provided in the disclosure may include nonvolatile and/or volatile memories. The non-volatile memories may include a Read-Only Memory (ROM), a Programmable ROM (PROM), an Electrically Programmable ROM (EPROM), an Electrically Erasable And Programmable ROM (EEPROM), or a flash memory. The volatile memories may include a Random Access Memory (RAM), or an external cache memory. As not a limitation but an illustration, the RAM is available in many forms, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchronous Chain Channel (Synchlink) DRAM (SLDRAM), a Direct Memory Bus Dynamic RAM (DRDRAM), and a Memory Bus Dynamic RAM (RDRAM), among others.

Various technical features of the above embodiments may be combined arbitrarily. For brevity of description, description is not made to all possible combinations of the various technical features of the above embodiments are described. However, all the combinations of these technical features should be considered to fall within the scope of disclosure contained in the specification as long as there is no contradiction between the combinations of those technical features.

The above embodiments merely illustrate several implementations of the disclosure, which are described in detail, but are not to be construed as limiting the scope of the present patent for the present invention. It should be pointed out that those of ordinary skill in the art can also make some modifications and improvements without departing from the concept of the disclosure, and these modifications and improvements all fall within the scope of protection of the disclosure. Accordingly, the scope of the patent of the disclosure should be subject to the appended claims.

What is claimed is:

1. A memory space expansion method, the method being applied to a server, wherein the server comprises a first Field Programmable Gate Array (FPGA), and the first FPGA is connected to a second FPGA in a remote memory array apparatus, comprising:

receiving an access instruction configured with a virtual address;

determining that a page table entry corresponding to the virtual address does not exist in a local page table and a remote page table during querying, and an unallocated physical address does not exist in the server, performing an operation of creating, on the basis of a physical address in the remote memory array apparatus, a remote memory page table entry corresponding to the virtual address;

wherein after the access instruction configured with the virtual address is received, the method further comprises:

analyzing the access instruction to determine an instruction type of the access instruction;

determining the instruction type of the access instruction is a data migration type, performing data migration based on a data migration direction;

determining the instruction type of the access instruction is a calculation type and the access instruction comprises the calculation data, calculating calculation data based on an instruction code;

determining that the instruction type of the access instruction is the calculation type and the access instruction comprises a source virtual address of the calculation data, performing an operation of querying, from the local page table or the remote page table, a source physical address corresponding to the source virtual address, reading the calculation data from the source physical address, and calculating the calculation data based on the instruction code.

2. The memory space expansion method as claimed in claim 1, wherein the first FPGA comprises a first Remote Direct Memory Access (RDMA) network card module; the second FPGA comprises a second RDMA network card module; and the first RDMA network card module is connected to the second RDMA network card module via a network.

3. The memory space expansion method as claimed in claim 1, wherein the method further comprises:

determining that a local page table entry or a remote page table entry corresponding to the virtual address exists in the local page table or the remote page table, performing an operation of converting the virtual address into a physical address on the basis of the local page table entry or the remote page table entry.

4. The memory space expansion method as claimed in claim 3, wherein converting the virtual address into a physical address on the basis of the local page table entry or the remote page table entry comprises:

determining that a local page table entry corresponding to the virtual address does exist in the local page table, performing the operation of converting the virtual address into the physical address on the basis of the local page table entry; and determining that a remote page table entry corresponding to the virtual address being existed in the remote page table, performing the operation of converting the virtual address into the physical address on the basis of the remote page table entry.

5. The memory space expansion method as claimed in claim 4, wherein converting the virtual address into the physical address on the basis of the local page table entry comprises:

obtaining a starting address based on the virtual address and the local page table entry; and obtaining the physical address by combining the starting address as a page frame code with an in-page offset in the virtual address.

6. The memory space expansion method as claimed in claim 1, wherein the method further comprises:

determining that the unallocated physical address exists in the server, performing the operation of creating, on the basis of the unallocated physical address in the server, the local page table entry corresponding to the virtual address.

7. The memory space expansion method as claimed in claim 1, wherein performing data migration based on the data migration direction comprises:

determining that the data migration direction is from the server to the remote memory array apparatus, and the access instruction comprises a first virtual address and a second virtual address, performing the operation of querying a first physical address corresponding to the first virtual address in the local page table, and querying a second physical address corresponding to the second virtual address in the remote page table;

reading first data from the first physical address of the server, and sending the first data to the remote memory array apparatus to be written into the second physical address;

determining that the data migration direction is from the remote memory array apparatus to the server, and the access instruction comprises the first virtual address and the second virtual address, performing the operation of querying the first physical address corresponding to the first virtual address in the local page table, and querying the second physical address corresponding to the second virtual address in the local page table; and sending a memory reading instruction to the remote memory array apparatus, to read second data from the second physical address in the remote memory array apparatus to be written into the first physical address of the server.

8. The memory space expansion method as claimed in claim 1, wherein after the calculation data based on the instruction code is calculated, the method further comprises:

determining that a calculation result of the calculation data needing to be saved, and the access instruction comprises a target virtual address for saving the calculation result, performing the operation of querying a target physical address corresponding to the target virtual address from the local page table or the remote page table, and writing the calculation result into the target physical address.

9. The memory space expansion method as claimed in claim 8, wherein querying a target physical address corresponding to the target virtual address from the local page table or the remote page table, and writing the calculation result into the target physical address comprises:

determining that the target physical address exists in the local page table, performing an operation of writing the calculation result into the local memory by the PCIE.

10. The memory space expansion method as claimed in claim 8, wherein querying a target physical address corresponding to the target virtual address from the local page table or the remote page table, and writing the calculation result into the target physical address comprises:

determining that the target physical address exists in the remote page table, performing an operation of sending an RDMA_WRITE instruction to the second RDMA module by the first RDMA module;

writing the calculation result into the remote memory array apparatus based on the RDMA_READ instruction.

11. The memory space expansion method as claimed in claim 1, wherein querying, from the local page table or the remote page table, a source physical address corresponding to the source virtual address, reading the calculation data from the source physical address comprises:

determining that the source physical address exists in the local page table, performing an operation of reading the calculation data from a local memory by a Peripheral Component Interconnect Express (PCIE).

12. The memory space expansion method as claimed in claim 1, wherein querying, from the local page table or the remote page table, a source physical address corresponding to the source virtual address, reading the calculation data from the source physical address comprises:

determining that the source physical address exists in the remote page table, performing an operation of sending an RDMA_READ instruction to the second RDMA module by the first RDMA module;

reading the calculation data from the remote memory array apparatus based on the RDMA_READ instruction.

13. The memory space expansion method as claimed in claim 1, wherein determining that a page table entry corresponding to the virtual address does not exist in a local page table and a remote page table during querying, and an unallocated physical address does not exist in the server, performing an operation of creating, on the basis of a physical address in the remote memory array apparatus, a remote memory page table entry corresponding to the virtual address comprises:

querying whether the page table entry corresponding to the virtual address is in the local page table and the remote page table;

determining that the page table entry corresponding to the virtual address does not exist in the local page table and the remote page table during querying determining whether the unallocated physical address is in the server;

determining that the unallocated physical address does not exist in the server, performing the operation of creating the remote memory page table entry corresponding to the virtual address on the basis of a physical address in the remote memory array apparatus.

14. An electronic device, comprising a memory, and at least one processor, wherein the memory stores a computer-readable instruction, and when the computer-readable instruction is executed by at least one processor, cause the at least one processor to:

receive an access instruction configured with a virtual address;

determine that a page table entry corresponding to the virtual address does not exist in a local page table and a remote page table during querying, and an unallocated physical address does not exist in a server, perform an operation of creating, on the basis of a physical address in the remote memory array apparatus, a remote memory page table entry corresponding to the virtual address; analyzing the access instruction to determine an instruction type of the access instruction;

perform data migration based on a data migration direction in response to the instruction type of the access instruction being a data migration type;

calculate calculation data based on an instruction code in response to the instruction type of the access instruction being a calculation type and the access instruction comprises the calculation data; and determine that the instruction type of the access instruction is the calculation type and the access instruction comprises a source virtual address of the calculation data, perform an operation of querying, from the local page table or the remote page table, a source physical address corresponding to the source virtual address, reading the calculation data from the source physical address, and calculating the calculation data based on the instruction code.

15. The electronic device as claimed in claim 14, wherein when the computer-readable instruction is executed by at least one processor, cause the at least one processor to:

determine that a local page table entry or a remote page table entry corresponding to the virtual address exists in the local page table or the remote page table, perform an operation of converting the virtual address into a physical address on the basis of the local page table entry or the remote page table entry.

16. The electronic device as claimed in claim 14, wherein when the computer-readable instruction is executed by at least one processor, cause the at least one processor to:

determine that the unallocated physical address exists in the server; and perform the operation of creating, on the basis of the unallocated physical address in the server, the local page table entry corresponding to the virtual address.

17. The electronic device as claimed in claim 14, wherein when the computer-readable instruction is executed by at least one processor, cause the at least one processor to:

determine that data migration direction being from the server to the remote memory array apparatus, and the access instruction comprises a first virtual address and a second virtual address, perform the operation of querying a first physical address corresponding to the first virtual address in the local page table, and querying a second physical address corresponding to the second virtual address in the remote page table;

read first data from the first physical address of the server, and send the first data to the remote memory array apparatus to be written into the second physical address;

determine that the data migration direction is from the remote memory array apparatus to the server, and the access instruction comprises the first virtual address and the second virtual address, perform the operation of querying the first physical address corresponding to the first virtual address in the local page table, and querying the second physical address corresponding to the second virtual address in the local page table; and send a memory reading instruction to the remote memory array apparatus, to read second data from the second physical address in the remote memory array apparatus to be written into the first physical address of the server.

18. At least one processor non-volatile computer-readable storage media, storing a computer-readable instruction, wherein when the computer-readable instruction is executed by the at least one processor, cause the at least one processor to:

receive an access instruction configured with a virtual address;

determine that a page table entry corresponding to the virtual address does not exist in a local page table and a remote page table during querying, and an unallocated physical address does not exist in a server, perform an operation of creating, on the basis of a physical address in the remote memory array apparatus, a remote memory page table entry corresponding to the virtual address; analyzing the access instruction to determine an instruction type of the access instruction;

perform data migration based on a data migration direction in response to the instruction type of the access instruction being a data migration type;

calculate calculation data based on an instruction code in response to the instruction type of the access instruction being a calculation type and the access instruction comprises the calculation data;

determine that the instruction type of the access instruction is the calculation type and the access instruction comprises a source virtual address of the calculation data, perform an operation of querying, from the local page table or the remote page table, a source physical address corresponding to the source virtual address, reading the calculation data from the source physical address, and calculating the calculation data based on the instruction code.

* * * * *